United States Patent Office 3,028,300
Patented Apr. 3, 1962

3,028,300
GERMICIDAL COMPOSITIONS AND METHODS FOR PREPARING THE SAME
Abraham Cantor, Elkins Park, Pa., and Murray W. Winicov, Flushing, N.Y., assignors to West Laboratories, Inc., Long Island City, N.Y., a corporation of New York
No Drawing. Filed Sept. 13, 1960, Ser. No. 55,733
18 Claims. (Cl. 167—17)

This invention relates to improved novel compositions of poly(N-vinyl-2-pyrrolidone), iodine and an iodide in which the iodine is markedly and measurably complexed to a greater extent than ever before.

Certain beneficial properties of a poly(N-vinyl-2-pyrrolidone)-iodine (hereinafter described as PVP-I) were described in United States Patent No. 2,739,922 (H. A. Shelanski, March 27, 1956), the most noteworthy of these being reduced toxicity and substantially less irritation and sensitizing effects than with iodine per se. The above patent teaches the equivalence of many forms of iodine for combination with PVP, to achieve relatively non-toxic PVP-iodine complexes. No differences were described therein for the various PVP-I compositions derived from the various sources of iodine. The patent cited states that the vapor pressure of iodine over the claimed PVP-iodine solutions was substantially reduced to 0 as indicated by the lack of odor of iodine and by a negative starch test on a piece of starch-KI paper suspended overhead. Analysis of all the PVP-I combinations showed that in addition to iodine available for titration by thiosulfate, there was some iodide present and a very small amount of chemically combined "bound" iodine. Aqueous solutions of PVP-I were found to slowly decrease in available iodine content and increase in iodide content until a ratio of approximately 2:1 iodine to iodide was reached. At this point the iodine content was judged to be "stable."

Subsequent published art was directed primarily toward improving the stability of the PVP-I complex with respect to shelf-life of the guaranteed minimum available iodine content. In United States Patent No. 2,706,701 (H. Beller and W. Hosmer April 15, 1952, April 19, 1955), solid PVP and solid elemental iodine are dry-blended at elevated temperatures of 90–100° C. for as much as several days until a portion of the available iodine is reduced to the iodide form. The heating is continued until the ratio of available iodine to iodide ion is substantially 2:1. No mention is made of the heat degradation of the polymer. The patent states that the heating "completed the process of formation of a complex in which the iodine is chemicaly available but not free."

In United States Patent No. 2,826,532, sodium bicarbonate is added to the dry-blended PVP-I of the Beller and Hosmer United States Patent No. 2,706,701 so that aqueous solutions of the product would be essentially neutral with respect to pH. Here again available iodine stability was a most important criterion and it is emphasized that hardly any change in the relative amounts of iodine and iodide occurred on ageing, beyond the approximately 2:1 iodine:iodide ratio.

A recent patent, United States No. 2,900,305 further improves on the dry-blending process by specifying that a small amount of moisture in PVP is preferable to dry PVP. The examples show that here again the heating is continued until the iodine to iodide ratio is 2:1, and that aqueous solutions of PVP-iodine made from such dry-blended powders are desirable in that they have less tendency to decrease in available iodine content through formation of iodide than when prepared by the previous method.

The fact that iodine in combination with PVP is superior to ordinary iodine for various applications has been stressed in the prior art, particularly with respect to decreased toxicity, less irritation, lower iodine vapor pressure and prolonged effect. There has been agreement that the above mentioned beneficial properties are concomitant with the "complexing" of the iodine, and that the PVP and iodine are the active ingredients involved. In reality, however, former estimates concerning PVP-I "complexing" were essentially qualitative and crude, and the necessary prerequisites for the optimum formulation of iodine preparations were therefore essentially ignored.

For the purpose of formulating and evaluating such improved PVP-I products, it became necessary to measure the complexation of iodine quantitatively. A distribution coefficient method has therefore been adapted wherein the iodine in an aqueous solution containing PVP and iodine is equilibrated between the aqueous layer and a non-miscible solvent, heptane. The amount of iodine extracted by the heptane layer is directely related to the amount of uncomplexed iodine in the aqueous layer. By expressing the results as the ratio of the concentrations of iodine in the two layers, it is possible to determine precisely the degree of complexing. The initial amount of available iodine in the aqueous layer is determined by ordinary thiosulfate titration; the final available iodine concentration in the heptane solution is determined colorimetrically.

The distribution of a common solute such as iodine between the two mutually immiscible solvents, heptane and aqueous complexer, is a reproducible characteristic for the solute and solvents involved at a specified temperature. For "ideal" solutions, and where the amount of solute used is small compared to its maximum solubility, the ratio of concentration of solute in the solvents is a constant, independent of the relative amounts of solvent or the amount of solute. Although the iodine solutions with which we are concerned do not rigidly fall into the "ideal" class, they are sufficiently close to this goal to give physical meaning to the distribution values obtained. Excellent reproducibility has been observed, which makes the procedure a useful tool in evaluating even small differences between similar compositions. While other solvents might be used in place of heptane, the usefulness of the new test procedure depends on using one solvent in all tests; and heptane has been found highly effective as the standard solvent.

The distribution coefficient (D.C.) is determined by adding 1.00 ml. of a previously titrated test solution to 25 mls. of heptane in a stoppered glass container. The container is placed in a bath maintained at 25° C.±1° while it is agitated vigorously for one minute. The solution is then allowed to stand for a few minutes before sampling of the clear heptane layer by pipette. Iodine in heptane layer is determined at 520 mu, the absorption peak; the relationship between absorbance and iodine concentration in this solvent is linear throughout the range 1 to 25 mg. per 100 mls. Using a Beckman model DV spectrophotometer, an absorption of 0.142 corresponded to 1.00 mg. iodine extracted 25 mls. heptane. The iodine remaining in the aqueous phase is determined by difference. The distribution coefficient is calculated by the following formula:

$$D.C. = \frac{\text{mg. } I_2 \text{ remaining in aq. phase}}{\text{mg. } I_2 \text{ in heptane}} \times \frac{\text{mls. heptane}}{\text{mls. aq. phase}}$$

Values so obtained are readily reproducible to within 10%, and frequently to within 1%.

It has been established that distribution coefficient as determined by the above formula must be approximately 200 or greater for the iodine in PVP-iodine complexes to be satisfactorily complexed, i.e. free of objectionable iodine odor and free of irritating effects. When tested by this procedure, PVP-iodine compositions prepared according to the previously known methods rarely showed a D.C. as high as 200, and frequently showed much lower values.

It has now been discovered, in accordance with the present invention, that by combining an iodide such as HI or an alkali metal iodide with PVP and iodine in amounts to provide more than 0.5 part and preferably more than 1.0 part of I⁻ per part of iodine, products can readily be prepared having distribution coefficients greater than 200; and that by suitably increasing the I⁻-iodine ratio degrees of complexing of iodine can be achieved which are wholly impossible by the prior art methods.

The improvements in the PVP-iodine art which are achieved by the incorporation of iodide in PVP-iodine compositions in accordance with the present invention are three-fold. The incorporation of iodide provides PVP-iodine compositions having markedly enhanced iodine stability in preparations falling within the previously most useful range of 0.1 to 1.5% iodine concentration. Secondly, the incorporation of iodide with PVP and elemental iodine can be effected without the heating which has been employed heretofore. Thus, the process of formulating powdered concentrates is improved and simplified. Thirdly, the powdered concentrates are distinctly superior because of the better iodine complexing.

Of special significance is the fact that the incorporation of iodide in accordance with the present invention permits the preparation of stable (D.C. >200) compositions at the practical 1% iodine level containing as little as a 3:1 to 5:1 ratio of PVP to iodine, whereas heretofore this has been impossible, and the normal practice has been to employ about a 10:1 ratio of PVP to iodine to provide satisfactory 1% iodine solutions.

Regarded in certain of its broader aspects the present invention comprises the process of preparing a germicide by combining PVP with iodine and an iodide selected from the class consisting of HI and alkali metal iodides in proportions to provide a PVP/I$_2$ ratio of at least 3 and an I⁻/I$_2$ ratio sufficiently greater than 0.5 so that an aqueous solution of said germicide of 1% iodine concentration exhibits an enhancement in excess of about 100 and a value in excess of about 200 for distribution coefficient (D.C.) as determined by the formula:

$$D.C. = \frac{mg.\ I_2\ remaining\ in\ aq.\ phase}{mg.\ I_2\ in\ heptane} \times \frac{ml.\ heptane}{ml.\ aq.\ phase}$$

and the improved germicides so obtained. More specifically, the sum of the PVP/I$_2$ and I⁻/I$_2$ ratios should be at least 6 to provide a solution of 1% iodine concentration having a D.C. greater than 200, whereas this degree of complexing is obtained with 0.5%, 0.25%, and 0.125% iodine solutions when the sum of said ratios is at least 8, 12, and 20 respectively.

The source of iodide can be varied depending on the nature and intended use of the product desired. For many types of products where a relatively high pH (about pH 5 to 7) is desired, it is preferable to introduce iodide as an alkali metal iodide. In this way, superior powdered concentrates can be directly prepared. If a lower pH is desired, or if it is preferable to prepare directly an aqueous composition, the iodide can be added as an aqueous HI solution and suitably an HI-iodine solution containing the desired ratio of iodide (I⁻) to iodine. In such instance, later pH adjustment by addition of alkali will provide iodide essentially in the form of alkali metal iodide.

The following examples will serve to show how the improvements of the present invention can be employed in the preparation of various PVP-iodine-iodide compositions, and how they compare with procedures and compositions heretofore available, but it is to be understood that the examples are given by way of illustration and not of limitation.

EXAMPLE I

*Preparation Based on Prior Art*

Varying amounts of finely powdered iodine and dry PVP (K30 Plasdone from Antara Division, GAF), containing 5% water were combined in a series of preparations using the procedure of Siggia (U.S. Patent 2,900,305) and Beller and Hosmer (U.S. Patent 2,706,701). The preparations were heated to 95° C. in sealed containers which were rolled periodically to insure uniformity. After about twenty hours, the available iodine content dropped to about 65% of the initial total value, and analysis showed that the ratio of available iodine to iodide was almost exactly 2:1, which is the recommended value in these two patents and in the Shelanski patent (U.S. 2,739,922). It was consistently found that the sum of the available iodine plus iodide was very close to the total iodine content; i.e., the amount of iodine organically bound was insignificant. The latter observation is probably the result of a lower monomer content in the PVP than that of previous workers. Pertinent data concerning these compositions are shown in Table I.

TABLE I

| Prepn. No. | Grams iodine added | Grams PVP added | Percent avail. iodine at finish | Percent I⁻ | Approx. ratio PVP/iodine | Ratio I⁻ to iodine |
|---|---|---|---|---|---|---|
| 1 | 60 | 120 | 22.0 | 11.0 | 3 | ½ |
| 2 | 30 | 80 | 18.0 | 9.0 | 4 | ½ |
| 3 | 30 | 100 | 14.5 | 7.5 | 5 | ½ |
| 4 | 30 | 140 | 11.1 | 5.5 | 7 | ½ |
| 5 | 30 | 160 | 10.5 | 5.0 | 8 | ¼ |

EXAMPLE II

*Preparations Using Iodides*

Varying amounts of finely powdered iodine, dry PVP and powdered iodide (as identified in the following table) were combined in a series of preparations by mechanical blending at room temperature in sealed containers. At the end of approximately 24 hours all the elemental iodine had become uniformly distributed. Titration for available iodine showed that between 90 to 95% of the original iodine content was present as available iodine. Pertinent data concerning these compositions are shown in Table II.

TABLE II

| Prepn. No. | Grams iodine added | Grams PVP added | Grams iodide added | Percent avail. iodine | Percent I⁻ | Approx. ratio PVP/iod. | Approx. ratio I⁻/iod. |
|---|---|---|---|---|---|---|---|
| 6 | 10 | 30 | 60 KI | 9.5 | 46 | 3 | 5 |
| 7 | 10 | 40 | 50 NaI | 9.6 | 43 | 4 | 4.5 |
| 8 | 10 | 50 | 40 NaI | 9.3 | 34 | 5 | 3.5 |
| 9 | 10 | 70 | 20 NaI | 9.2 | 17 | 7 | 2 |
| 10 | 10 | 80 | 10 NaI | 9.0 | 9 | 8 | 1 |
| 11 | 10 | 30 | 40 KI | 12.1 | 38 | 3 | 3 |
| 12 | 10 | 30 | 50 KI | 10.6 | 42.5 | 3 | 4 |
| 13 | 10 | 40 | 20 KI | 13.3 | 22 | 4 | 1.5 |
| 14 | 10 | 40 | 40 KI | 10.6 | 34 | 4 | 3 |
| 15 | 10 | 40 | 50 KI | 9.6 | 38 | 4 | 4 |
| 16 | 10 | 40 | 100 KI | 6.4 | 51 | 4 | 8 |
| 17 | 10 | 60 | 20 KI | 10.2 | 17.0 | 6 | 1.5 |
| 18 | 10 | 60 | 40 KI | 2.6 | 28 | 6 | 3 |
| 19 | 10 | 60 | 50 KI | 8.1 | 31 | 6 | 4 |
| 20 | 10 | 60 | 100 KI | 5.6 | 45 | 6 | 8 |
| 21 | 10 | 80 | 20 KI | 8.5 | 14 | 8 | 1.5 |
| 22 | 10 | 80 | 40 KI | 7.3 | 23.5 | 8 | 3 |
| 23 | 10 | 80 | 50 KI | 6.9 | 27.5 | 8 | 4 |
| 24 | 10 | 80 | 100 KI | 5.1 | 40 | 8 | 8 |
| 25 | 10 | 100 | 20 KI | 7.0 | 12 | 10 | 1.5 |
| 26 | 10 | 100 | 40 KI | 6.3 | 20.5 | 10 | 3 |
| 27 | 10 | 100 | 50 KI | 6.1 | 24 | 10 | 4 |
| 28 | 10 | 100 | 100 KI | 4.4 | 36.5 | 10 | 8 |

Dilutions of the powdered compositions of Examples I and II were prepared in distilled water to provide iodine contents of pharmaceutical applicability (i.e. 1%, 0.5% and 0.25% I). The pH was adjusted to correspond to slightly acid (pH 2.5±0.5) and almost neutral (pH 5.0±0.5) preparations. Distribution coefficients for these samples were obtained by the method previously given. The data is shown in the following tabulations with products of similar PVP to iodine ratio grouped together so as to compare the differences between the prior art compositions and those in accordance with the present invention. Distribution coefficient values of less than 100 smell noticeably of iodine; between 100 and about 250 the odor decreases and becomes acceptable at about 200.

Results are arranged in order of increasing PVP to available iodine ratio, Tables III to X. Within each table compositions of similar available iodine content are grouped together. Examples of compositions obtainable with the previous art, containing ratios of 0.5 iodide to iodine have been placed first.

TABLE III

| Dilution of powder No. | Avail. iodine, percent | Ratio PVP/iodine | Ratio I-/iodine | pH | D.C. |
|---|---|---|---|---|---|
| (a) 1 | 1 | 3 | 0.5 | 2.5 | 70 |
| (b) 6 | 1 | 3 | 5.0 | 2.5 | 460 |
| (c) 12 | 1 | 3 | 4.0 | 5.0 | 265 |
| (d) 11 | 1 | 3 | 3.0 | 5.0 | 205 |
| (e) 1 | 0.5 | 3 | 0.5 | 2.5 | 30 |
| (f) 6 | 0.5 | 3 | 5.0 | 2.5 | 160 |

TABLE IV

| Dilution of powder No. | Avail. iodine, percent | Ratio PVP/iodine | Ratio I-/iodine | pH | D.C. |
|---|---|---|---|---|---|
| (a) 2 | 1 | 4 | 0.5 | 2.5 | 100 |
| (b) 7 | 1 | 4 | 4.5 | 2.5 | 1,040 |
| (c) 2 | 1 | 4 | 0.5 | 5.0 | 100 |
| (d) 13 | 1 | 4 | 1.5 | 5.0 | 180 |
| (e) 14 | 1 | 4 | 3.0 | 5.0 | 390 |
| (f) 15 | 1 | 4 | 4.0 | 5.0 | 505 |
| (g) 16 | 1 | 4 | 8.0 | 5.0 | 890 |
| (h) 2 | 0.5 | 4 | 0.5 | 2.5 | 40 |
| (i) 7 | 0.5 | 4 | 4.5 | 2.5 | 285 |
| (j) 13 | 0.5 | 4 | 1.5 | 5.0 | 100 |
| (k) 15 | 0.5 | 4 | 4.0 | 5.0 | 215 |
| (l) 16 | 0.5 | 4 | 8.0 | 5.0 | 320 |

TABLE V

| Dilution of powder No. | Avail. iodine, percent | Ratio PVP/iodine | Ratio I-/iodine | pH | D.C. |
|---|---|---|---|---|---|
| (a) 3 | 1.0 | 5 | 0.5 | 2.5 | 180 |
| (b) 3 | 1.0 | 5 | 0.5 | 5.0 | 155 |
| (c) 8 | 1.0 | 5 | 3.5 | 2.5 | 1,240 |
| (d) 8 | 1.0 | 5 | 3.5 | 5.0 | 1,500 |
| (e) 3 | 0.5 | 5 | 0.5 | 2.5 | 50 |
| (f) 8 | 0.5 | 5 | 3.5 | 2.5 | 310 |

TABLE VI

| Dilution of powder No. | Avail. iodine, percent | Ratio PVP/iodine | Ratio I-/iodine | pH | D.C. |
|---|---|---|---|---|---|
| (a) 17 | 1 | 6 | 1.5 | 5.0 | 490 |
| (b) 18 | 1 | 6 | 3 | 5.0 | 1,150 |
| (c) 19 | 1 | 6 | 4 | 5.0 | 1,330 |
| (d) 20 | 1 | 6 | 8 | 5.0 | 2,220 |
| (e) 17 | 0.5 | 6 | 1.5 | 5 | 184 |
| (f) 19 | 0.5 | 6 | 4 | 5 | 475 |
| (g) 20 | 0.5 | 6 | 8 | 5 | 895 |
| (h) 19 | 0.25 | 6 | 4 | 5 | 130 |
| (i) 20 | 0.25 | 6 | 8 | 5 | 230 |

TABLE VII

| Dilution of powder No. | Avail. iodine, percent | Ratio PVP/iodine | Ratio I-/iodine | pH | D.C. |
|---|---|---|---|---|---|
| (a) 4 | 1 | 7 | 0.5 | 2.5 | 230 |
| (b) 4 | 1 | 7 | 0.5 | 5.0 | 200 |
| (c) 9 | 1 | 7 | 1.75 | 2.5 | 1,095 |
| (d) 9 | 1 | 7 | 1.75 | 5.0 | 1,420 |
| (e) 4 | 0.5 | 7 | 0.5 | 2.5 | 65 |
| (f) 9 | 0.5 | 7 | 1.75 | 2.5 | 265 |

TABLE VIII

| Dilution of powder No. | Avail. iodine, percent | Ratio PVP/iodine | Ratio I-/iodine | pH | D.C. |
|---|---|---|---|---|---|
| (a) 5 | 1 | 8 | 0.5 | 2.5 | 310 |
| (b) 5 | 1 | 8 | 0.5 | 5.0 | 220 |
| (c) 10 | 1 | 8 | 1 | 2.5 | 720 |
| (d) 10 | 1 | 8 | 1 | 5.0 | 875 |
| (e) 22 | 1 | 8 | 3 | 5.0 | 1,595 |
| (f) 23 | 1 | 8 | 4 | 5.0 | 1,890 |
| (g) 24 | 1 | 8 | 8 | 5.0 | 3,120 |
| (h) 5 | 0.5 | 8 | 0.5 | 2.5 | 80 |
| (i) 10 | 0.5 | 8 | 1 | 2.5 | 155 |
| (j) 21 | 0.5 | 8 | 1.5 | 5.0 | 310 |
| (k) 23 | 0.5 | 8 | 4 | 5.0 | 725 |
| (l) 24 | 0.5 | 8 | 8 | 5.0 | 1,170 |
| (m) 23 | 0.25 | 8 | 4 | 5.0 | 195 |
| (n) 24 | 0.25 | 8 | 8 | 5.0 | 335 |

TABLE IX

| Dilution of powder No. | Avail. iodine, percent | Ratio PVP/iodine | Ratio I-/iodine | pH | D.C. |
|---|---|---|---|---|---|
| (a) 25 | 1 | 10 | 1.5 | 5 | 1,100 |
| (b) 26 | 1 | 10 | 3 | 5 | 2,020 |
| (c) 27 | 1 | 10 | 4 | 5 | 2,520 |
| (d) 28 | 1 | 10 | 8 | 5 | 3,470 |
| (e) 25 | 0.5 | 10 | 1.5 | 5 | 410 |
| (f) 27 | 0.5 | 10 | 4 | 5 | 1,015 |
| (g) 28 | 0.5 | 10 | 8 | 5 | 1,690 |
| (h) 27 | 0.25 | 10 | 4 | 5 | 265 |
| (i) 28 | 0.25 | 10 | 8 | 5 | 425 |

Consideration of the data included in the foregoing tabulations, leads to a number of interesting conclusions. From Table III it is apparent that at a PVP/iodine ratio of 3, it is impossible with the prior art I-/iodine ratio of 0.5 to obtain satisfactory products, and that this ratio must be at least 3 to provide a distribution coefficient of 200 or more. Similarly in Tables IV and V it is apparent that at PVP/iodine ratios of 4 and 5, the prior art I-/iodine ratio of 0.5 does not produce satisfactory products, and it is necessary that this ratio be respectively at least 2 and somewhat greater than 0.5. Although no data concerning compositions with a I-/iodine ratio of 0.5 is shown in Table VI, it is evident from a comparison with Tables V and VII that this is the approximate transition point where such prior art ratio can provide satisfactory products at the 1% iodine level.

Tables VI to IX become more significant in showing the comparative iodide effect at other practical iodine concentrations such as 0.5% iodine and 0.25% iodine. It is significant to note in this connection that the I-/iodine ratio of 0.5, characteristic of the prior art, cannot produce satisfactory 0.5 or 0.25% iodine solutions at practical PVP/iodine ratios.

It will be noted that with an iodide/iodine ratio greater than 0.5 the distribution coefficient values obtained at pH 5 are slightly higher than at pH 2.5, other conditions being equal. This is somewhat surprising due to the anticipated tendency for iodine to become less firmly complexed as pH is increased. However, the effect of pH in the 2.5 to 5.0 pH range is relatively insignificant compared with the gross effect of added iodide on iodine complexation as evidenced by distribution coefficient.

In summary, therefore, it is possible to prepare PVPiodine-iodide compositions having satisfactory iodine complexing as evidenced by a distribution coefficient in excess of 200 in the following areas which were impossible with the 0.5:1 I−/iodine ratio of the prior art.

(a) Compositions having an iodine concentration of 1% wherein the PVP/iodine ratio is 3:1 to 5:1. The ability to use such low amounts of PVP is of distinct practical advantage in view of the high cost of PVP.

(b) Compositions having an iodine concentration of 0.5% throughout a range of 4:1 to at least 10:1 in PVP/iodine ratio.

(c) Compositions having an iodine concentration of 0.25%, throughout a range of PVP/iodine ratio extending from a lower limit of 6:1 to a theoretical upper limit dictated only by the amount of PVP that can be tolerated on a price basis or solids basis in commercially practical compositions.

(d) Within the areas of improvement mentioned in (a), (b) and (c) above, the use of added iodide in controlled amounts permits great flexibility in the formulation of compositions having varying amounts of PVP and iodine which will provide the extent of iodine complexing which is desired for various germicidal products.

A fuller visualization of the points mentioned in (a) to (d) above is possible from a consideration of the following tabulation of selected data from Tables III to IX:

TABLE X

| When PVP/I$_2$ ratio is— | Then I−/I$_2$ ratio, to provide D.C. >200 (at specified percent I$_2$) must be at least— | | | |
|---|---|---|---|---|
| | 1% I$_2$ | 0.5% I$_2$ | 0.25% I$_2$ | 0.125% I$_2$ |
| 3 | 3 | 5+ | | |
| 4 | 1.5+ | 4 | | |
| 5 | | 3.5− | | |
| 6 | .5 est. | 2 est. | 6 est. | |
| 7 | .5 | 1.5 est. | | |
| 8 | <.5 | 1 | 4 | |
| 10 | | <1 est. | 2 est. | 10 est. |
| (1) | | | | 8 |
| PVP/I$_2$ + I−/I$_2$ = | 6 | 8 | 12 | 20 |

[1] Not in Tables III to IX, but prepared in the manner described using a powder containing 10 gm. of iodine, 200 gm of PVP and 100 gm. of KI.

NOTE.—"Est." means that the values are estimated from related values in Tables III to IX.

The foregoing tabulation and the values for

PVP/I$_2$+I−/I$_2$ appearing at the foot thereof suggests the following formula.

$$\text{PVP/I}_2 + \text{I}^-/\text{I}_2 \leqslant 4 + \frac{2}{\text{Percent I}_2}$$

Furthermore, with the limitation that I−/I$_2$ must be >0.5, this formula is considered to embrace the subject matter of the present invention and to distinguish from the prior art.

CORRELATION BETWEEN OLD ART STARCH PAPER TEST AND DISTRIBUTION COEFFICIENT (D.C.)

Statements have been made in the past concerning the presence or absence of a positive starch test using starch-iodide impregnated paper that was held over an iodine source. Previous workers have rarely given any procedural detail, much less establish a semi-quantitative scale for estimating relative iodine vapor pressure over "complexed" iodine solutions. Since the actual iodine vapor pressure of iodine over a solution of iodine is really never "0," no matter how low is might actually be, it is obvious that phrases such as a "positive test," "starch test was negative" or "no starch test" could describe a wide range of actual values, positive tests by one method and negative tests by another.

A carefully standardized starch-iodide paper test has therefore been employed to evaluate the compositions described in this invention. The test is reproducible and in agreement with estimates of iodine complexing by other methods. In particular, the starch-iodide tests so conducted substantiate the quantitative results obtained by the distribution coefficient method. The following example presents the procedure and typical comparative results:

EXAMPLE III

The equipment employed is (1) borosilicate test tube measuring 150 x 18 mm. (2) Starch-iodide test paper. (3) Fisher Scientific No. 14–860 stopper for test-tube above through which a 10 mm. diameter tube approx. 160 mm. in length has been passed. When the stopper is placed in the test tube, the 10 mm. tube should be about 35 mm. from the bottom. (4) Copper wire about 25 cm. in length (B & S No. 16 is suitable) bent at one end to form a small hook.

In conducting the tests, one ml. of the test solution at 25° C. is placed in the bottom of the test tube without getting any of the material on the sides. Then the stopper and tube is put in place. The starch iodide test paper is put on the hook, moistened with a drop of water and let down through the tube until the lower edge is exactly 10 mm. above the surface of the test liquid. The wire is held in place by a suitable support. The time required for the first definitely blue or purple coloration is recorded.

A positive test under these conditions within one minute is evidence of insufficient complexation, i.e.—the iodine odor is detectable. By noting the relative amount of color formation as a function of time, closer correlations can be made. The following tabulation presents starch iodide test data thus obtained for a number of representative materials together with the corresponding D.C. data:

TABLE XII

| Sample ident. | Avail. I$_2$ | PVP/I | I−/I | D.C. | Starch paper test time for positive reaction, min. |
|---|---|---|---|---|---|
| Table V a | 1 | 5 | 0.5 | 180 | <<1 |
| Table V c | 1 | 5 | 3.5 | 1,250 | >>>1 |
| Table V e | 0.5 | 5 | 1.5 | 50 | <<1 |
| Table V f | 0.5 | 5 | 3.5 | 310 | >1 |
| Table VIII i | 0.5 | 8 | 1 | 155 | 1 |
| (1) | 0.5 | 10 | 2.3 | 610 | >>1 |

[1] Prepared in the same manner as compositions reported in Table IX.

Various changes and modifications in the compositions and formulation procedures herein disclosed will occur to those skilled in the art, and to the extent that such changes and modifications are embraced by the appended claims, it is to be understood that they constitute part of our invention.

We claim:

1. The process for directly preparing an iodine germicide of enhanced iodine complexing that comprises combining poly(N-vinyl-2-pyrrolidone) with iodine and an iodide selected from the class consisting of HI and alkali metal iodides in proportions to provide a PVP/I$_2$ ratio of at least 3 and an I−/I$_2$ ratio sufficiently greater than 0.5 so that an aqueous solution of said germicide of 1% iodine concentration exhibits an enhancement in excess of about 100 and a value in excess of about 200 for distribution coefficient (D.C.) as determined by the formula:

$$\text{D.C.} = \frac{\text{mg. I}_2 \text{ remaining in aq. phase}}{\text{mg. I}_2 \text{ in heptane}} \times \frac{\text{ml. heptane}}{\text{ml. aq. phase}}$$

2. The process as defined in claim 1 wherein the components are combined under essentially anhydrous conditions, the iodide being an alkali metal iodide, and the resulting germicide being a free flowing powder.

3. A germicidal composition consisting essentially of a complex of PVP with iodine and an iodide selected from the group consisting of HI and alkali metal iodides prepared by the process as defined in claim 1.

4. A powdered germicidal composition consisting essentially of a complex of PVP with iodine and an alkali metal iodide prepared by the process as defined in claim 2.

5. A germicidal composition consisting essentially of a complex of poly(N-vinyl-2-pyrrolidone) with iodine and an iodide selected from the group consisting of HI and alkali metal iodides, the amount of PVP being sufficient to provide a $PVP/I_2$ ratio of at least 3, the amount of iodide being sufficient to provide an $I^-/I_2$ ratio greater than 0.5 and the proportions of PVP, iodine and iodide being such that the sum of the ratios $PVP/I_2+I^-/I_2$ is not less than about 6, whereby an aqueous dilution of such composition providing a 1% iodine concentration exhibits an enhancement in excess of about 100, and a value in excess of about 200, for distribution coefficient (D.C.) as determined by the formula:

$$D.C. = \frac{\text{mg. } I_2 \text{ remaining in aq. phase}}{\text{mg. } I_2 \text{ in heptane}} \times \frac{\text{mls. heptane}}{\text{mls. aq. phase}}$$

6. A germicidal composition as defined in claim 5 wherein the proportions of PVP, iodine and iodide are such that the sum of the ratios $PVP/I_2+I^-/I_2$ is not less than about 8, whereby an aqueous dilution of such composition providing a 0.5% iodine concentration exhibits a distribution coefficient (D.C.) in excess of about 200.

7. A germicidal composition as defined in claim 5 wherein the proportions of PVP, iodine and iodide are such that the sum of the ratios $PVP/I_2+I^-/I_2$ is not less than about 12, whereby an aqueous dilution of such composition providing a 0.25% iodine concentration exhibits a distribution coefficient (D.C.) in excess of about 200.

8. A germicidal composition as defined in claim 5 wherein the proportions of PVP, iodine and iodide are such that the sum of the ratios $PVP/I_2+I^-/I_2$ is not less than about 20, whereby an aqueous dilution of such composition providing a 0.125% iodine concentration exhibits a distribution coefficient (D.C.) in excess of about 200.

9. An aqueous germicidal solution consisting essentially of PVP, iodine, and an iodide selected from the group consisting of HI and alkali metal iodides, the $PVP/I_2$ ratio being at least 3, the $I^-/I_2$ ratio being greater than 0.5 and the proportions of PVP, iodine and iodide being such as to satisfy the following equation:

$$PVP/I_2+I^-/I_2 \nless 4+\frac{2}{\text{Percent } I_2}$$

said solution exhibiting a distribution coefficient (D.C.) in excess of about 200 as determined by the formula:

$$D.C. = \frac{\text{mg. } I_2 \text{ remaining in aq. phase}}{\text{mg. } I_2 \text{ in heptane}} \times \frac{\text{mls. heptane}}{\text{mls. aq. phase}}$$

10. The process for preparing PVP-iodine germicidal concentrate exhibiting enhanced iodine complexation that comprises mixing together without heating powdered PVP elemental iodine and an alkali metal iodide in proportions to provide an $I^-/I_2$ ratio greater than 0.5 and a $PVP/I_2$ ratio of at least 3 with the sum of said ratios $$I^-/I_2+PVP/I_2$$

being not less than about $$4+\frac{2}{x}$$

wherein $x$ is a number within the range of about 0.1 to 1 representing the percent $I_2$ in a desired aqueous dilution of said concentrate.

11. An aqueous germicidal solution consisting essentially of PVP, iodine, and an iodide selected from the group consisting of HI and alkali metal iodides, said solution having an iodine concentration of $x$ percent where $x$ is a number within the range of about 0.1 to 1.0, the $PVP/I_2$ ratio being at least 3, the $I^-/I_2$ ratio being greater than 0.5 and the proportions of PVP, iodine and iodide further satisfying the following equation:

$$PVP/I_2+I^-/I_2 \nless 4+\frac{2}{x}$$

said solution exhibiting a distribution coefficient (D.C) in excess of about 200 as determined by the formula:

$$D.C. = \frac{\text{mg. } I_2 \text{ remaining in aq. phase}}{\text{mg. } I_2 \text{ in heptane}} \times \frac{\text{mls. heptane}}{\text{mls. aq. phase}}$$

12. An aqueous germicidal solution as defined in claim 11 wherein the iodine concentration is about 1% and $PVP/I_2+I^-/I_2$ is not less than about 6.

13. An aqueous germicidal solution as defined in claim 11 wherein the iodine concentration is about 0.5% and $PVP/I_2+I^-/I_2$ is not less than about 8.

14. An aqueous germicidal solution as defined in claim 11 wherein the iodine concentration is about 0.25% and $PVP/I_2+I^-/I_2$ is not less than about 12.

15. An aqueous germicidal solution as defined in claim 11 wherein the iodine concentration is about 0.125% and $PVP/I_2+I^-/I_2$ is not less than about 20.

16. A germicidal composition consisting essentially of 30 parts by weight of PVP complexed with 10 parts of iodine and an alkali metal iodide providing 50 parts of $I^-$.

17. A germicidal composition consisting essentially of 40 parts by weight of PVP complexed with 10 parts of iodine and an alkali metal iodide providing 45 parts of $I^-$.

18. A germicidal composition consisting essentially of 200 parts by weight of PVP complexed with 10 parts of iodine and an alkali metal iodide providing 80 parts of $I^-$, said composition being particularly adapted for the preparation of aqueous solutions containing as little as 0.1% to 0.5% iodine.

References Cited in the file of this patent

UNITED STATES PATENTS

| | | |
|---|---|---|
| 2,706,701 | Beller et al. | Apr. 19, 1955 |
| 2,739,922 | Shelanski | Mar. 27, 1956 |
| 2,826,532 | Hosmer | Mar. 11, 1958 |
| 2,900,305 | Siggia | Aug. 18, 1959 |